Oct. 25, 1932.  E. A. STEWART  1,884,346

PROCESS OF PRODUCING MARBLE EFFECTS IN CERAMICS

Filed Jan. 24, 1930

Inventor

E.A.Stewart

By Frank and Bishop

Attorneys

Patented Oct. 25, 1932

1,884,346

UNITED STATES PATENT OFFICE

ENOS A. STEWART, OF CANTON, OHIO

PROCESS OF PRODUCING MARBLE EFFECTS IN CERAMICS

Application filed January 24, 1930. Serial No. 423,127.

The invention relates to the producing of marble effects upon bricks, tiles and other clay products; and the object of the improvement is to provide a process by which clays of various colors may be mixed together to produce a marble effect in ceramic products, to be used either as a veneer or as a body of the product.

The above and other objects may be attained by forming layers of plastic clays of various colors and shades and placing several layers together in any desired color combination; the laminations then being cut transversely into strips and placed in a brick machine or brick veneer machine provided with an auger or the like, the action of which intermingles the various colors, producing a marble effect in the brick or tile or other product of the machine, or in the veneer upon such product.

Figure 1:
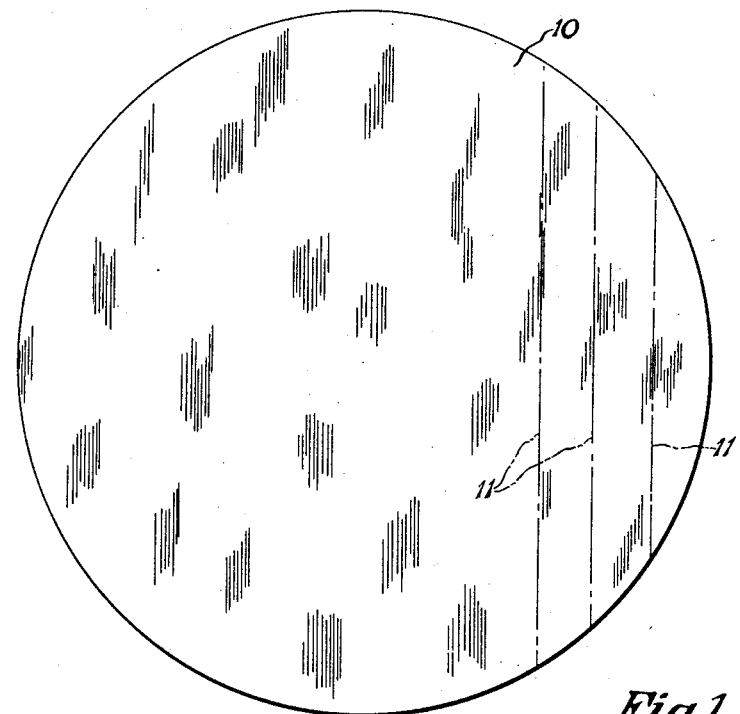
Figure 2:
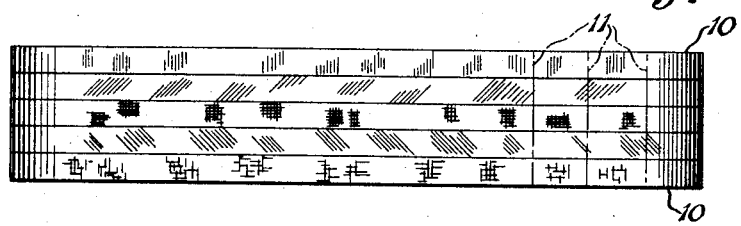
Figure 3:
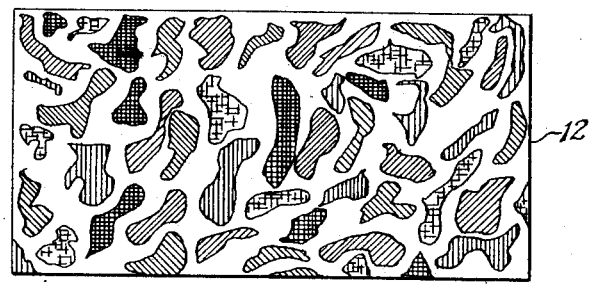

The manner of carrying out the improved process is illustrated in the accompanying drawing, in which Figure 1 is a plan view of the disks of clay or shale showing the manner in which they are cut transversely into laminated strips;

Fig. 2, an edge elevation of the same, showing the manner in which disks of several different colors or shades are placed together to produce the desired effects; and Fig. 3, an elevation of a brick or the like made or veneered by the improved process, illustrating the marble effect produced thereby.

Similar numerals refer to similar parts throughout the drawing.

In carrying out the invention a plurality of layers of clay or shale, or both, of different desired colors and shades, and of a pasty consistency are first formed. As shown in Figs. 1 and 2, the layers may be in the form of disks, indicated generally at 10, and may be formed in a filter press or the like.

These disks contain about twenty per cent moisture and are preferably about two feet in diameter and one or two inches in thickness, depending upon the desired effect to be produced in the finished brick or tile.

Any desired or possible combination of colors or shades of disks may be placed one upon another, as illustrated in Fig. 2, in which the lower disk may be yellow, the next green, then black and brown and the upper disk red.

These disks or layers being of a pasty consistency are stuck together in the manner shown and above described, after which the laminated structure thus formed is cut transversely as upon the lines indicated at 11, in Figs. 1 and 2, producing a series of similar laminated strips, each having the same arrangement of colors or shades therein.

The laminated strips of vari-colored clay or shale thus produced are then placed in a brick machine, or brick veneer machine of usual and ordinary construction, provided with an auger or the like.

The laminated strips are carried around in the machine by the auger or other mechanism therein and the several strips are intermixed or churned into a conglomerate mass, producing a marble effect in the finished brick or tile, or the veneer therefor, issuing from the machine, as indicated generally at 12 in Fig. 3.

It will be understood that many different effects may be produced and various kinds of marble imitated in the clay products or veneers, by varying the combination of colors or the relative thickness of the several layers of plastic clay or shale. Thus it is possible, by the use of the improved process, to produce artificial marble closely resembling the natural product.

While the invention has been illustrated and described as carried out by first forming disks of plastic clay or shale in a filter press, it should be understood that the layers may be of any other shape and may be formed in any other apparatus which will produce a layer or sheet of pasty consistency.

It should also be understood that although the process is described as producing various marble effects, onyx or other geological formations may be imitated in the same manner, by combining the proper quantities and colors of clay or shale layers.

The finished brick or tile, either formed wholly of the plastic composition, of marble or other geological formation, or veneered therewith, is then burned in a kiln as in usual practice.

I claim:

1. The method of making artificial geological formations which consists in forming layers of various colors of clay of pasty consistency, placing the layers one upon another, transversely cutting the superposed layers into laminated strips, churning the strips into a conglomerate mass, forming the mass into a desired shape and burning the finished product in a kiln.

2. The method of making artificial geological formations which consists in forming layers of various colors of clay of pasty consistency, placing the layers one upon another, transversely cutting the superposed layers into laminated strips, churning the strips into a conglomerate mass, applying a layer of the mass to a plastic column, and burning the finished product in a kiln.

3. The method of making artificial geological formations which consists in forming layers of various colors of clay of pasty consistency containing about twenty per cent moisture, placing the layers one upon another, transversely cutting the superposed layers into laminated strips, churning the strips into a conglomerate mass, forming the mass into a desired shape and burning the finished product in a kiln.

4. The method of making artificial geological formations which consists in forming layers of various colors of clay of pasty consistency in a filter press, placing the layers one upon another, transversely cutting the superposed layers into laminated strips, churning the strips into a conglomerate mass, forming the mass into a desired shape and burning the finished product in a kiln.

5. The method of making artificial geological formations which consists in forming disks of various colors of clay of pasty consistency, placing the disks one upon another, transversely cutting the superposed disks into laminated strips, churning the strips into a conglomerate mass, forming the mass into a desired shape and burning the finished product in a kiln.

6. The method of making artificial geological formations which consists in forming disks of various colors of clay of pasty consistency in a filter press, placing the disks one upon another, transversely cutting the superposed disks into laminated strips, churning the strips into a conglomerate mass, forming the mass into a desired shape and burning the finished product in a kiln.

7. The method of making artificial geological formations which consists in intermingling portions of various colors of clay of pasty consistency, churning the portions of clay into a conglomerate mass, forming the mass into a desired shape, and burning the finished product in a kiln.

In testimony that I claim the above, I have hereunto subscribed my name.

ENOS A. STEWART.